United States Patent [19]

Zizine

[11] 4,248,086
[45] * Feb. 3, 1981

[54] DEVICE FOR MEASURING THE MASS FLOW OR FLOW RATE OF AN INSULATING LIQUID

[75] Inventor: Jean L. Zizine, L'Hay-les-Roses, France

[73] Assignee: S.C.I. Le Brin, Champigny-sur-Marne, France

[*] Notice: The portion of the term of this patent subsequent to Sep. 11, 1996, has been disclaimed.

[21] Appl. No.: 881,115

[22] Filed: Feb. 24, 1978

Related U.S. Application Data

[63] Continuation-in-part of Ser. No. 801,423, May 27, 1977, Pat. No. 4,167,114, which is a continuation-in-part of Ser. No. 634,631, Nov. 24, 1975, Pat. No. 4,056,003.

[51] Int. Cl.³ .................... G01F 1/64; G01F 1/78
[52] U.S. Cl. ........................................ 73/861.09
[58] Field of Search ............................. 73/194 F

[56] References Cited

U.S. PATENT DOCUMENTS

| | | |
|---|---|---|
| 3,688,106 | 8/1972 | Brain . |
| 3,706,938 | 12/1972 | Petriw . |
| 3,835,707 | 9/1974 | Hadjidjanian . |
| 3,996,795 | 12/1976 | Servassier . |
| 4,041,376 | 8/1977 | Furuto et al. ............... 73/194 F |

FOREIGN PATENT DOCUMENTS 2250981  6/1975  France .

Primary Examiner—Charles A. Ruehl
Attorney, Agent, or Firm—Morgan, Finnegan, Pine, Foley & Lee

[57] ABSTRACT

A device for measuring the mass flow or flow rate of an insulating liquid which entrains ions produced by an electrode positioned in the path of the liquid flow, this electrode being brought to a certain potential with respect to at least one other electrode also arranged in the flow path.

26 Claims, 10 Drawing Figures

DEVICE FOR MEASURING THE MASS FLOW OR FLOW RATE OF AN INSULATING LIQUID

RELATED APPLICATIONS

This application is a continuation-in-part of my earlier U.S. application Ser. No. 801,423, filed May 27, 1977 now U.S. Pat. No. 4,167,114, which in turn is a continuation-in-part of my earlier U.S. application Ser. No. 634,631 filed Nov. 24, 1975, now U.S. Pat. No. 4,056,003.

BACKGROUND AND BRIEF DESCRIPTION OF THE INVENTION

The present invention relates to an insulating liquid measuring device, and more particularly to a device for measuring the mass flow or the flow rate of an insulating liquid (hereinafter simply called "liquid"), especially a liquid hydrocarbon.

It is known to measure gas flow by means of a jet of ions directed perpendicular to the flow. The jet of ions is generated by the corona effect and the deviation in the path of the ions caused by the gas flow is measured. In such known flowmeters, the ions are generated at a source which may be a disc, or a wire and are collected on plane or cylindrical metallic electrodes in such a manner that the ion beam crosses the gas flow substantially perpendicular to the direction of the gas flow. Such flowmeters do not fit for insulating liquids and have the disadvantage of being extremely sensitive to the nature of the electric charge carriers (ions) created in the immediate vicinity of the source, as well as to the variations in the speed of transfer of the ions in going from the source to the collector electrode. Moreover, such known flowmeters have a gas flow passage the cross-section of which is limited to a few centimeters to avoid having to apply too high an ionization voltage, and also to provide sufficient accuracy in the measurements.

Briefly, a measuring device according to the present invention comprises first and second electrodes positioned in the path of the liquid flow, the second electrode being spaced from the first electrode in the flow direction, means for providing an electric potential between the first and second electrodes to enable the first electrode to produce ions for entrainment by the liquid flow and for passing through the second electrode, and the first and second electrodes being arranged such that an ion passing through the second electrode leaves the first electrode in a direction substantially perpendicular to the surface of the first electrode or to a plane tangent to the point of emission of the ion at the first electrode surface, and is incident on the second electrode in a direction substantially perpendicular to the surface of the second electrode or to a plane tangent to the point of incidence of the ion at the second electrode surface.

With the arrangement of the present invention, measurement is substantially independent of the dimensions of the cross-section of the liquid flow passage in the measuring device.

In one preferred form of device embodying the present invention, the device is in the form of a gauge with the liquid whose flow characteristics are to be determined traversing a conductive electrode and the ions being created in the liquid stream upstream of this conductive electrode. The ion flow is measured which has been able to traverse the electrode under the effect of the liquid flow to be determined, this electrode is hereafter called a "transparent" electrode.

In a device embodying the invention, there is obtained a high measure of stability which is not disturbed by fluctuations of the ion source, the determination of the proportion of ions which cross the transparent electrode being independent of the flux of incident ions.

The ion source may be very close to the transparent electrode (network or grating). In practice, their distance is limited only by the dielectric rigidity between the ion source and this transparent grating. Thus, there is substantially no possibility that the ions of the liquid to be measured will combine with pollutants. In addition, the voltage to be applied between the ion source and the transparent grating is independent of the cross-section of the liquid stream, which enables a low operating voltage to be used in all cases.

In another preferred form of a device embodying the invention, the ion flux which has traversed the transparent grating is measured by means of a collector electrode, also in the form of a grating or network, located downstream of the transparent grating. As a consequence, an average measure of the ions appearing on this collector electrode is obtained and the various fluctuations of the ion source, such as emission noise due to gas particles, on the source which cause dispersion of the discharge do not disturb the measurement.

If desired, a gauge embodying the invention may have a symmetrical structure with respect to the electric field existing in the inter-electrode space. The inter-electrode space is fixed so as to be constant whatever may be the cross-sectional dimension of the flow passage for the liquid through the gauge. With this arrangement, the inter-electrode electric field becomes a constant factor for this type of gauge, once the value of the potential difference applied to the ion source is determined. As a result, such a gauge functions independently of the cross-section of the flow passage for the liquid. Thus, only a relatively low voltage source of low cost need be used and the accuracy of measurement, for a given voltage source, is practically the same whatever may be the cross-section of the flow passage for the liquid stream. Another advantage, more particularly for large passage sections for the liquid stream, is that because of this low voltage source, electrical insulation of the electrodes of the gauge is easy to effect.

Another advantage of such a gauge is that it has an ion source with a very low density of electric charge carriers in its immediate vicinity. In the gauges of the prior art, the density of the ions generated is very high, which results in a disturbance in the inter-electrode electric field as soon as a small variation in this ion density appears. These variations necessarily appear as soon as the liquid crossing the gauges contains some impurities. In the case of normal air, e.g., water vapor or smoke is in suspension therein with the result that measurements of the flow rate or flow of such a gas by gauges of the prior art is extremely dependent on such impurities.

In apparatus embodying the present invention, the density of electric charge carriers generated may be extremely small compared with the gauges of the prior art, for example 10–100 times smaller. It is thus evident that variations of this density will then, in terms of absolute value, be smaller in the same ratio, and that the effects on the measurements carried out become practically negligible, and in any case are less than the required accuracy.

Further, this low density feature relates to the aging or reliability of the ion source. The ion souces of gauges of the prior art, owing to the high density of electric charge carriers generated, suffers an intense bombardment by these carriers, resulting in a rapid deterioration of the source material. In contrast, ion sources in a low density gauge embodying the present invention, suffers only very small bombardment. Thus, for an identical material, the aging or deterioration is diminished in a ratio sufficient to permit utilization over a much longer time or more intense utilization.

In order that the present invention may be better understood, various embodiments embodying the invention are illustrated in the accompanying drawings. However, it should be understood that the present invention is not limited solely thereto.

DETAILED DESCRIPTION

Figure 1:
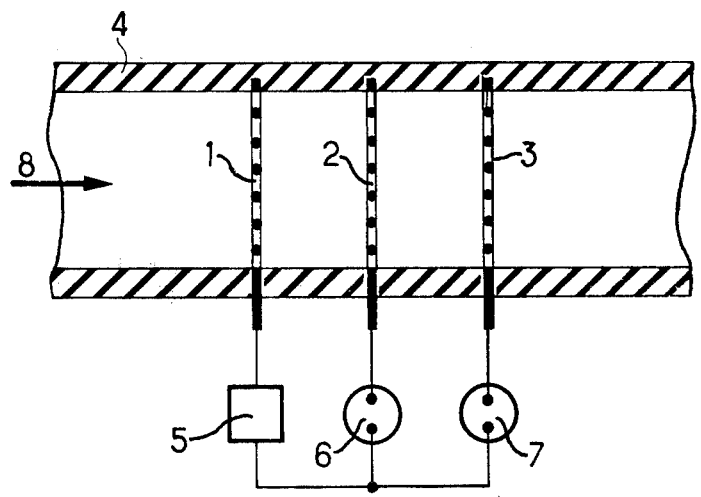
FIG. 1 is a partial sectional view of a device for measuring gas flow with a radioactive ion source.

Referring to FIG. 1, the device for measuring liquid flow with a radioactive ion source includes three electrodes 1, 2 and 3 formed of metallic gratings or networks arranged substantially perpendicularly to the liquid flow, e.g., within a pipe 4. The electrodes are electrically isolated from one another and dimensioned to occupy practically the entire cross-sectional area of the pipe 4. The electrode 1 is covered with a radioactive coating. A voltage source 5 is connected between the electrode 1 and the electrode 2, to create an electric field between these two electrodes which causes any ions which are generated at electrode 1 to move from electrode 1 toward electrode 2. In addition, a conventional current-measuring device 6 is arranged between the voltage source 5 and the electrode 2 and another conventional current-measuring device 7 is arranged between the electrode 3 and the common point between the voltage source 5 and the current measuring device 6. The arrow 8 indicates the direction of the liquid flow through the pipe 4.

The magnitude of the voltage source 5 is adjusted such that its value is sufficient to permit the collection of ions as soon as the speed of liquid flow is no longer zero. Let $\vec{E}$ be the value of the electric field in the vicinity of the wires of the electrode grating 2 and $\mu$ be the mobility of the ions in the liquid in question (generally expressed in $cm^2/V.s$). When the speed of liquid flow is zero, the speed v of the ions at any point in the space is $\vec{v} = \mu \cdot \vec{E}$ and nearly all the ions are collected by the electrode 2, since nearly all the lines of force terminate at this electrode 2.

As soon as the liquid flow has a speed $\vec{v}_o$ which is not zero, the speed $\vec{v}$ of the ions is $$\vec{v} = \vec{v}_o + \mu \cdot \vec{E}$$

For all the points in the space for which $|\vec{v}_o| > |\mu \cdot \vec{E}|$ the ions leave the lines of force and are carried beyond the electrode 2 and collected by the electrode 3. The current from electrode 3, indicated by the current-measuring device 7, is thus a well-defined function of the flow speed $v_o$ of the liquid. The current-measuring device 6 indicates the current due to the ions collected by the electrode 2 and the current-measuring device 7 indicates the current due to the ions collected by the electrode 3. The currents $I_2$ and $I_3$, which correspond, respectively, to the ions collected by the electrodes 2 and 3, are solely a function of the flow characteristics of the liquid.

The distance between the electrodes 1 and 2 is chosen to be sufficiently small to substantially reduce the recombination of the ions generated with, e.g., molecules of gas, the lower limit of this distance being in practice determined by the breakdown voltage between the electrodes 1 and 2. This distance is advantageously about 5 millimeters. The distance between the electrodes 2 and 3 is selected to be of approximately the same magnitude as the pitch of the grating constituting the electrode 1, its lower limit being the distance for which the lines of force traverse the electrode 2 when the liquid is at rest, without quite reaching the grating electrode 3. (If these lines of force were allowed to reach electrode 3, a current could be read on the current-measuring device 7 even when the speed of the liquid flow is zero.)

The pitch of the grating constituting the electrode 2 is of about 0.1 to 1 millimeter and the diameter of the wires thereof is between about 0.05 and 0.3 millimeter for a pipe 4 having an I.D. between about 1 and 5 centimeters.

Figure 2:
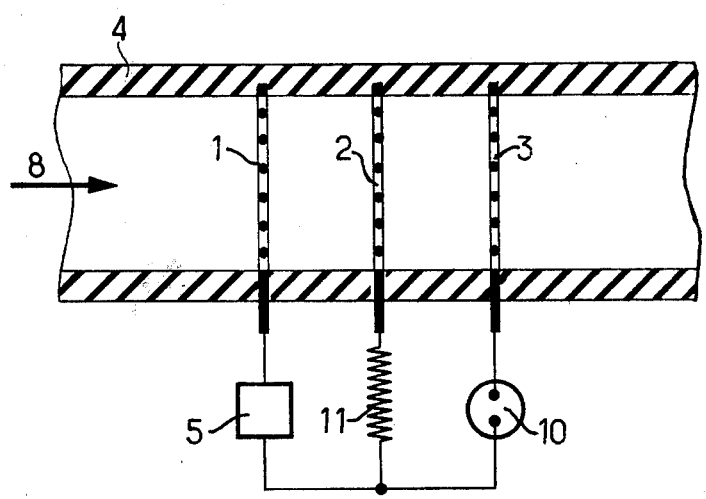
FIG. 2 is a partial sectional view of a device for measuring the gas flow with a corona effect ion source.

FIG. 2 shows another embodiment of the present invention in which the ion source is a corona discharge source. The measuring pipe 4 still comprises the three measuring electrodes 1, 2 and 3, but the electrode 1 is no longer covered with a radioactive coating. The current-measuring device 7 is replaced by a voltmeter 10 having a high input impedance. The input impedance is selected in such a manner that the current flowing through the voltmeter 10 is very small in relation to the operating current of the source and the voltage source 5 has a magnitude such that it produces a corona discharge at the electrode 1. The current-measuring device 6 has also been eliminated and replaced by a resistor 11.

The ions generated at the electrode 1 by the corona discharge move toward the electrode 2 under the effect of the electric field established by the voltage source 5. When the liquid whose flow is to be measured is at rest, the ions are practically all collected at the electrode 2.

When the liquid whose flow is to be measured has a non-zero speed and moves through the pipe 4 in the direction of the arrow 8, the ions are carried beyond the electrode 2 and reach the electrode 3. Since the voltmeter 10 has a high input impedance, a voltage appears at the electrode 3 which creates an electric field that opposes the ions moving toward the electrode 3. Let $\vec{E}_1$ be the electric field between the electrodes 2 and 3, $\mu$ the mobility of the ions and $\vec{v}_o$ be the speed of the liquid to be measured; then when $$\mu \cdot \vec{E}_1 \geqq \vec{v}_o$$

the ions will not reach the electrode 3.

The voltage which is generated at the electrode 3 is therefore a unique function of the flow characteristics of the liquid and it is therefore easy to measure the speed of flow of the liquid or its mass flow by a null method. According to this method, the electric field is such that practically all the ions are captured by the transparent grating 2, in such a manner that the current appearing at the electrode 3 is substantially nil. Owing to the very high resistance of the voltmeter 10, in spite of the very small number of ions arriving at the electrode 3, the voltage between this electrode and the electrode 2 is sufficient to repulse the ions.

Reverting to the arrangement of FIG. 1, $I_3$ is determined as follows:

$$I_3 = K(I_2 e \cdot v)/V;$$

$I_3$ being the current at the collector electrode 3, K a constant which depends on the geometry of the device, $I_2$ the current at the electrode 2, e the liquid density, v its speed, and V the difference in potential between the source 1 and the transparent grating 2. It is thus apparent that to measure the rate of flow or the mass flow of the liquid it is necessary to take into account the value of the current $I_2$ and the difference in potential V.

In order to obtain a direct measurement of the liquid flow rate v to be measured, a regulated supply can be used in such a manner that $I_2/V$ = constant. In this case the relationship (1) becomes:

$$I_3 = C v$$

C being another constant equal to $K I_2 e/V$

Figure 3:
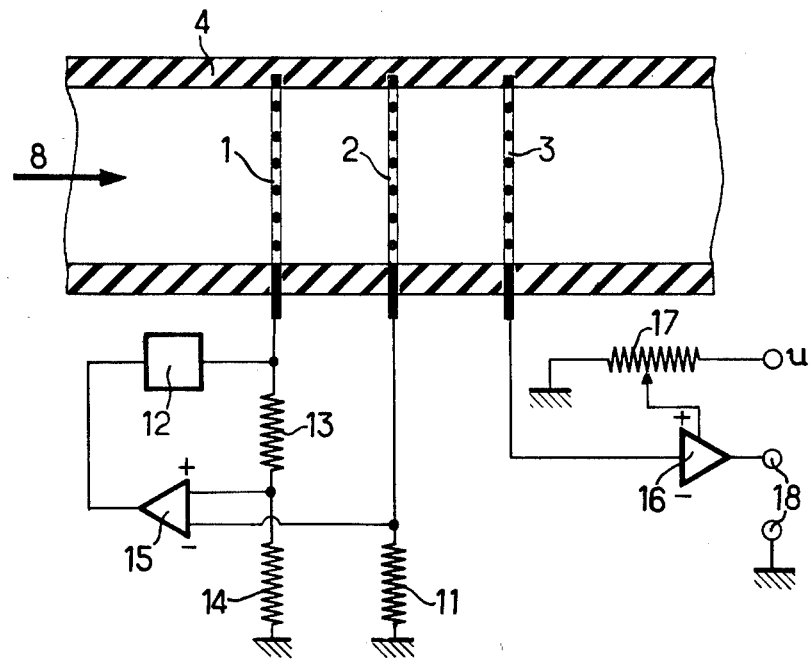
FIG. 3 is a partial sectional view similar to FIG. 2, in which means is provided for regulating the voltage and current supplied to the ion source.

An arrangement capable of carrying out such a direct measurement of the liquid flow rate is illustrated in FIG. 3. The electrode 1 is energized by a high voltage source 12, e.g., an oscillator voltage converter. Between the electrode 1 and ground, two resistors 13 and 14 are connected in series, forming a potential divider. The voltage at the junction of the resistors 13 and 14 is applied to the non-inverting input of a differential amplifier 15, the inverting input of which receives the voltage derived from the upper end of a resistor 11 connected between electrode 2 and ground. The output of the differential amplifier 15 is connected to a regulating input of the voltage source 12. The electrode 3 is connected to an amplifier 16 which, in known manner, permits the nulling of the residual current with the aid of a potentiometer 17 connected to an auxiliary voltage source u; such residual current may appear on electrode 3 when the liquid flow rate to be measured is nil and when the electrodes 2 and 3 are very close. At the output 18 of the amplifier 16, a voltage proportional to the flow rate or mass flow of the liquid through the gauge is obtained.

If $V_1$ is the voltage between the electrode 1 and earth, $R_{11}$, $R_{13}$ and $R_{14}$ are the respective values of the resistors 11, 13 and 14, the regulation of the voltage source 12 takes place in such a manner that:

$$\frac{V_1 R_{14}}{R_{13} + R_{14}} = R_{11} I_2$$

that is to say the voltages at the inverting and non-inverting inputs of the amplifier 15 are equalized. For this condition, $$\frac{I_2}{V_1} = \frac{R_{14}}{R_{11}(R_{13} + R_{14})}$$

This means that the expression $I_2/V_1$ is constant for given values of the resistors 11, 13 and 14, the accuracy of its value depending directly on the gain of the amplifier 15, which can be made as high as is required.

Figure 4:
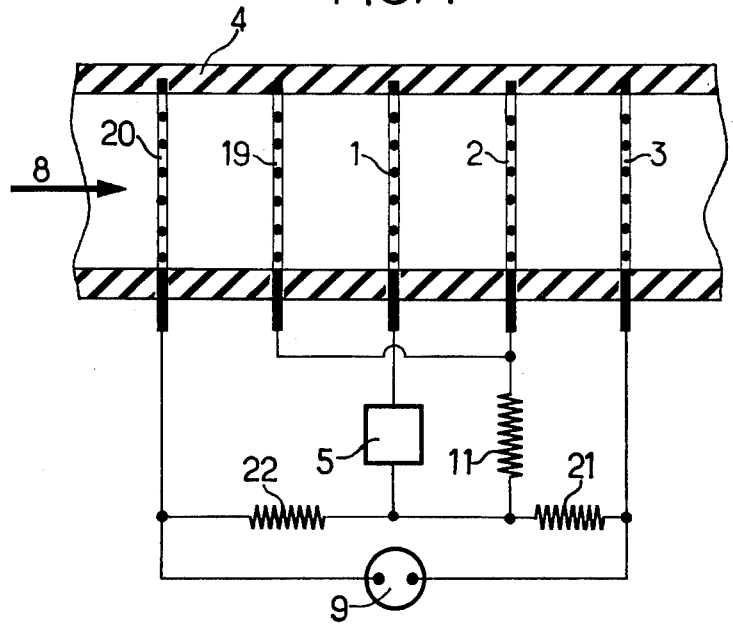
FIG. 4 is a partial sectional view of a device for gas flow measurement with a corona effect ion source, including means for measuring the current at the collector electrode.

FIG. 4 shows another embodiment of a device in accordance with the present invention utilizing a corona discharge ion source and measuring the current at the collector grating 3. In this embodiment, electrodes 19 and 20 are symmetrically arranged with respect to electrode 1, and spaced relative to electrode 1 the same distance as electrodes 2 and 3, respectively. Thus, the device is bi-directional.

Electrodes 2 and 19 are connected to one another and to one side of a high voltage source 5 through a resistor 11; the junction of the resistor 11 and the voltage source 5 is connected to electrodes 3 and 20, respectively, by resistors 21 and 22. A microammeter 9 is connected between electrodes 3 and 20. Thus, the arrangement formed is bi-directional. The value of the high voltage source 5 is chosen to cause a corona discharge about the electrode 1.

In this last embodiment, the operation is substantially the same as that previously described; the resistor 11 through which the current $I_2$ flows develops a voltage, between the electrodes 2 and 3, in such a manner as to improve the linearity of the measuring device. The microammeter 9 indicates the difference between the currents appearing at the electrodes 3 and 20, this difference being characteristic of the flow rate of the liquid. As previously described, the voltage source 5 is advantageously constructed in such a manner that the voltage at its terminals and the current which it supplies are in a constant ratio to provide a measurement which is a direct function of the flow rate of the liquid.

In all of the embodiments previously described, the operation of the gauge can be adjusted for a nil liquid flow rate either by adjusting the distance between the electrodes 2 and 3 with a mechanical device, or preferably by adjusting the electric field around the electrode 2 with a purely electrical adjusting device.

In addition, the embodiments of FIGS. 1–3 can be made bi-directional by adding a pair of electrodes symmetrically spaced about the source electrode 1 the same distance as electrodes 2 and 3.

If desired, the liquid flow can be channeled at the ion source section of the pipe 4. This may be accomplished, e.g., by profiling the internal surface of the pipe 4 at this section in such a manner as to form a slight peripheral flaring in the direction of the axis of the pipe 4, so that the liquid passes only through the active part of the source electrode.

The embodiments preferably described comprise plane electrodes, arranged in a measuring pipe, but it is evident that comparable measurements can be obtained with electrodes of other forms employing a transparent electrode and a collector electrode(s). For example, electrodes of cylindrical form or of spherical form can be arranged about the source.

Figure 5:
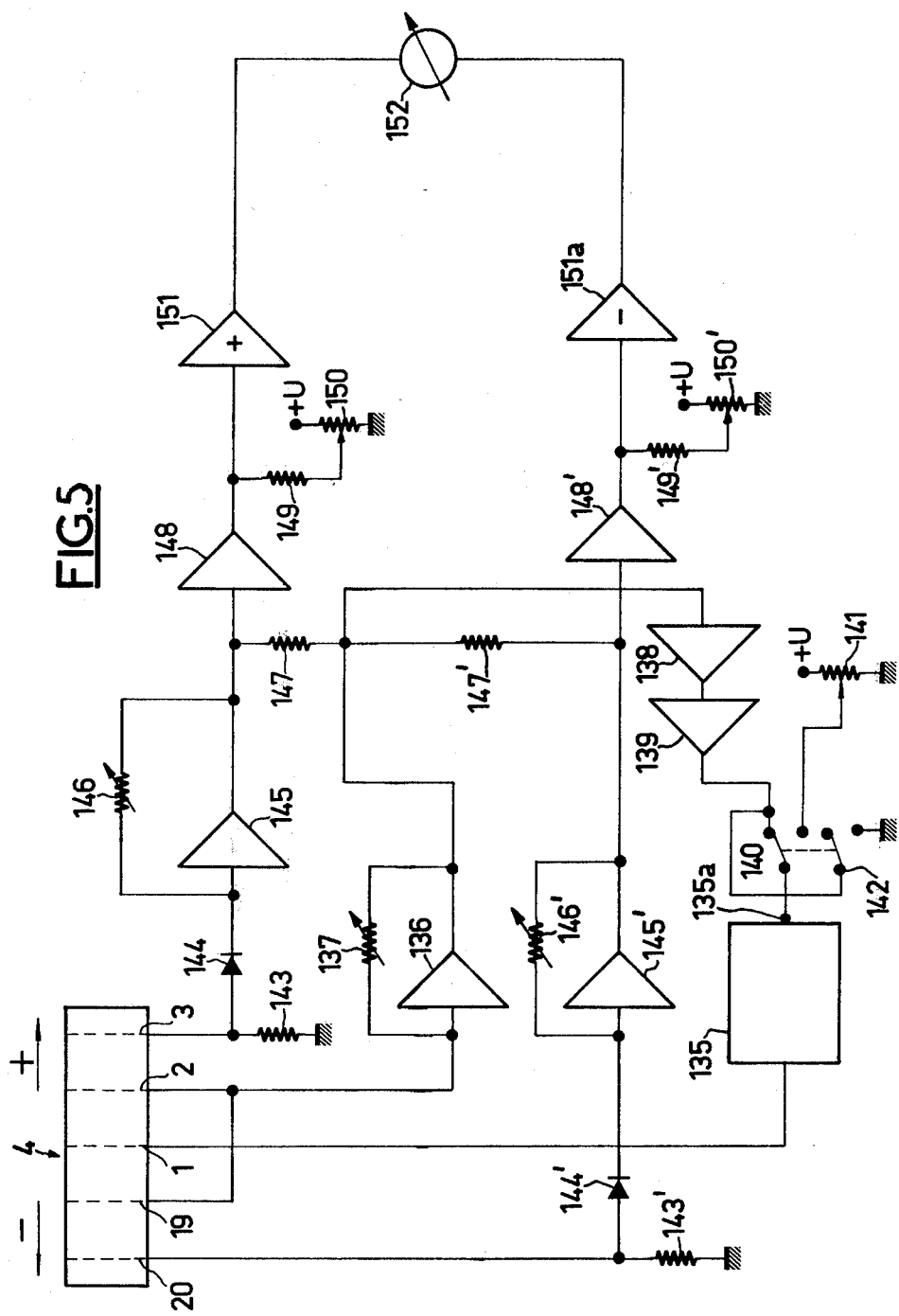
FIG. 5 is a schematic diagram of a measurement circuit for use with the devices of FIGS. 3 and 4.

FIG. 5 is a schematic diagram of an improved measurement circuit which can be used with a measuring device such as the one shown in FIG. 4. In FIG. 5 the electrodes 1, 2, 3, 19 and 20, as well as the device body in the form of support tube 4, have been represented in a very simplified manner.

The distance between electrodes 1 and 2 and between electrodes 1 and 19 is chosen to be sufficiently small to substantially reduce the recombination of the ions generated with pollutants, the lower limit of this distance being in practice determined by the breakdown voltage between said electrodes 1 and 2, and 1 and 19.

The lower limit of the distance between the electrodes 2 and 3, and electrodes 19 and 20 is determined by the distance for which the lines of force traverse electrodes 2 and 19 when the liquid is at rest, without quite reaching electrodes 3 and 20 respectively.

Electrode 1 comprises the ionic source and is connected to a high voltage source 135 of an appropriate value enabling electrode 1 to become a corona generator. Electrodes 19 and 20 are respectively arranged symmetrically to electrodes 2 and 3 with respect to electrode 1.

Electrodes 2 and 19 are connected together and to operational amplifier 136, the gain of which is adjusted by feedback resistor 137. The output of amplifier 136 is connected to the input of unity gain operational amplifier 138 used for isolation and impedance matching. The output of amplifier 138 is fed to the input of high gain amplifier 139. The output of amplifier 139 is connected to one fixed contact of inverter 140, the other fixed contact of which is connected to the wiper of potentiometer 141, the fixed contacts of which are connected between a source of constant voltage +U and ground. The output of amplifier 139 is also connected to the movable contact of inverter 142 which is mechanically paired with inverter 140. A first fixed contact of inverter 142, which corresponds to the fixed contact of inverter 140 which is connected to the output of amplifier 139, is not connected while the other fixed contact of inverter 142 is connected to ground. The movable contact of inverter 142 is connected to the voltage control input 135a of the high voltage power supply 135. Power supply 135 is standard and will not be further described.

Because the measuring device of FIG. 5 is bi-directional and symmetrical with respect to electrode 1, a plus sign has been assigned to the liquid flow going from left to right and a minus sign has been assigned to the flow moving in the opposite direction. Furthermore, due to this symmetry, the circuits connected between each of the electrodes 3 and 20 and the measuring device are essentially identical, except for an amplifier described below.

Electrodes 3 and 20 are connected to ground via resistors 143 and 143' as well as to diodes 144 and 144'. Diodes 144 and 144' are followed by adjustable gain operational amplifiers 145 and 145' comprising adjustable feedback resistors 146 and 146'. The way diodes 144 and 144' are connected depends on the polarity of the potential of electrode 1. In FIG. 5, this potential is positive and the cathodes of diodes 144 and 144' are connected to amplifiers 145 and 145'. Where the potential of electrode 1 is negative, anodes of diodes 144 and 144' would be connected to amplifiers 145 and 145'.

The outputs of amplifiers 145 and 145' are connected to the output of amplifier 136 by resistors 147 and 147'. The outputs of amplifiers 145 and 145' are also connected to the inputs of unity gain operational amplifiers 148 and 148' which are used for isolation and, if necessary, impedance matching. The outputs of amplifiers 148 and 148' are connected to resistors 149 and 149'. Resistors 149 and 149' are connected to the wipers of potentiometers 150 and 150' which in turn are connected between voltage source +U and ground. Potentiometers 150 and 150' are used to adjust the electric zero of the measuring device for a nil liquid flow. Amplifiers 148 and 148' are followed by high gain amplifiers 151 and 151a. Amplifier 151a, which corresponds to electrode 20, is an inverter in order to have a rectilinear transfer characteristic as explained below with reference to FIGS. 6, 7, and 8. Instead of using amplifier 151a, amplifier 148' or amplifier 145' corresponding to electrode 20 may be used as the polarity inverter.

The outputs of amplifiers 151 and 151a are connected to a display device such as galvanometer 152 with central zero. Galvanometer 152 may be replaced by any other display device having the same function. If the present measuring device is used to control, e.g., the gasoline flow in a fuel injection engine, the outputs of amplifiers 151 and 151a would be connected to a suitable control input of a gasoline flow controlling device. As previously explained with reference to FIG. 4, galvanometer 152 measures the flow characteristics of the liquid flowing through support tube 4.

When control input 135a of high voltage supply 135 is connected to the output of amplifier 139, as shown in FIG. 5, mass flow is measured. When inverters 140 and 142 are in the other position, flow rate is measured, the control input 135a of high voltage supply 135 being connected to a fixed potential determined by potentiometer 141. When control input 135a of supply 135 receives a fixed voltage, it can be shown in first approximation that the emission current of electrode 1 varies inversely as the density of the liquid whose flux characteristics are being measured, i.e., this current is a function of the liquid flow rate. According to FIG. 5, the current through resistor 147 is dependent on the sum of currents of electrodes 19, 2 and 3 (for the plus flow direction) while the current through resistor 147' is dependent on the sum of currents of electrodes 2, 19 and 20 (for the minus flow direction). Thus, amplifier 139 provides to supply 135 a value which is proportional to the current emitted by electrode 1. For example, in the case of flow in the plus direction, electrode 19 collects the ions emitted in the direction opposite to electrode 1, particularly in the case of slow liquid flux. In the same way, for flow in the minus direction, electrode 2 collects the ions emitted in the counter flow direction by electrode 1.

When control input 135a of supply 135 is connected to the output of amplifier 139, the high voltage produced by supply 135 is regulated according to the sum of the currents collected by electrodes 19, 2, 3 or 2, 19, 20 as explained above, that is, by maintaining the emission current of electrode 1 constant. In this case, it can be shown in first approximation that the indication of galvanometer 152 is proportional to the mass flow of the liquid passing through body 4 of the measuring device. The measure is related to the density of ions emitted by the active surface of source electrode 1, however, and it is preferable to maintain the proportion between the ionic source voltage and emission current voltage constant as explained above with reference to the measuring device shown in FIG. 3.

The input impedance of amplifiers 145 and 145', as seen from electrodes 3 and 20, should be very small so that the measurement will not be disturbed by the insulation defects of the device body.

Figure 6A:
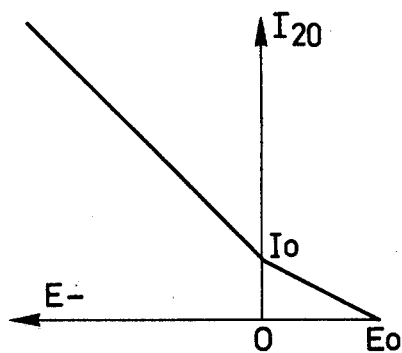
FIGS. 6a and 6b are graphs of the currents $I_{20}$ and $I_3$ of FIG. 5.
Figure 6B:
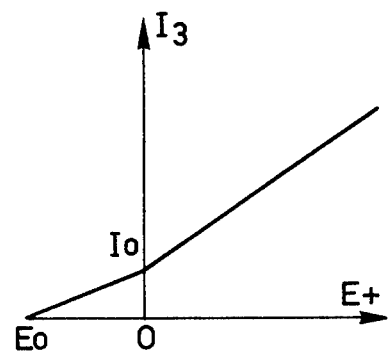
Figure 7A:
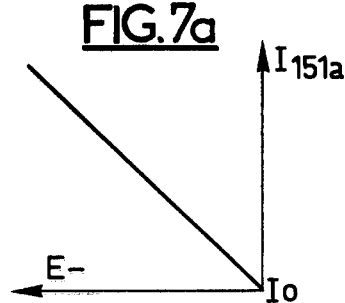
FIGS. 7a and 7b are graphs of the currents at the outputs of amplifiers 151a and 151 of FIG. 5.
Figure 7B:
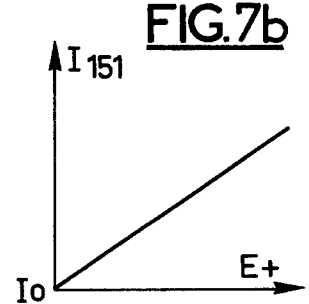

FIGS. 6a and 6b are graphs of the currents $I_{20}$ and $I_3$ collected by electrodes 20 and 3 respectively, depending on the dynamic characteristics E of the liquid flow going through the measuring device. These dynamic characteristics may either be the flow rate of the liquid or the mass flow as explained above.

The graphs in FIGS. 6a and 6b are practically linear and increase from a rest current value $I_o$, corresponding to an absence of flow. The rest current $I_o$ is due to the fact that the ions emitted by source electrode 1 are able to attain at least electrode 2 or 19 respectively because the distance separating electrode 1 from 2 or 19 is very small (several millimeters).

In each of the graphs of FIGS. 6a and 6b it can be seen that when the direction of flow is reversed, the current collected by electrode 20 or 3 respectively decreases with a slope different from that during direct flow, and the current collected becomes nil for a negative flow $E_o$.

Through use of biased diodes 144 and 144', only currents corresponding to a direct flow, i.e., currents larger than or equal to $I_o$, are transmitted to amplifiers 145 and 145'. Since diodes have threshhold voltages which must be overcome before full conduction is obtained, an offset voltage is introduced by means of resistors 149 and 149' and potentiometers 150 and 150'. The offset is introduced at the outputs of amplifiers 148 and 148', but may also be placed at any point of the circuit which is between diodes 144 and 144' and galvanometer 152. Potentiometers 150 and 150' are adjusted so that the zero current of amplifiers 151 and 151a coincides with the above-mentioned current $I_o$. Thus, at the outputs of amplifiers 151a and 151 there is obtained the characteristics represented in FIGS. 7a and 7b for which a zero flow gives zero current and for which negative flow produces no current.

Figure 8:
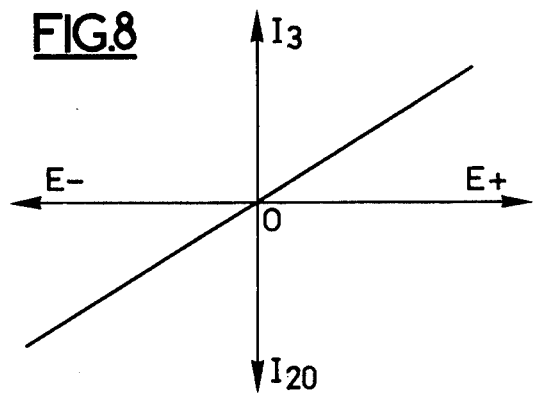
FIG. 8 is a graph of the currents $I_3$ and $I_{20}$ of FIG. 5.

Because of the superposition in galvanometer 152 of the output currents of amplifiers 151 and 151a, amplifier 151 being moreover a polarity inverter, there is obtained the characteristic shown in FIG. 8 which is symmetrical with respect to point 0. The central zero galvanometer 152 allows measurements of the flows occurring in either direction without any switching in the circuit.

In case of unidirectional measuring device, the circuit components responsive to electrode 20 or electrode 3 (for sensing only a plus or a minus liquid flow, respectively) may be omitted. The operation of this unidirectional device is substantially similar to that of the device shown in FIG. 3, except that all the generated ions are taken into account for regulating the high voltage source.

In some cases, especially for low flow speeds, diodes 144 and 144' may be omitted, the transfer characteristic of the measuring circuit then being slightly modified.

Of course, in case of sufficient voltage levels or suitable impedances, one or more of the amplifiers 148, 148', 151, 151a, 138 or 139 may be omitted.

The operation of the measuring device shown in FIG. 6 may also be adjusted for a nil liquid flow rate by adjusting the distance between the electrodes 2 and 3 or 19 and 20 with a mechanical device.

The electrodes of the measuring device are manufactured and arranged in the same way for the device explained with reference to FIGS. 1 to 4 herein, or for the device shown in U.S. patent application Ser. No. 790,560 filed Apr. 25, 1977.

It should be understood by those skilled in the art that various modifications may be made in the present invention without departing from the spirit and scope thereof, as described in the specification and defined in the appended claims.

What is claimed is:

1. A measuring device for measuring the mass flow of a liquid, comprising:

first, second, third and fourth electrodes positioned in the path of said liquid flow, said first, second, third and fourth electrodes being electrically isolated from each other, said second electrode being spaced from said first electrode in the flow direction, said third electrode being spaced from said second electrode in the flow direction, said fourth electrode being spaced from said first electrode in the counter-flow direction and being electrically connected to said second electrode;

a voltage source coupled between said first electrode and said second, third and fourth electrodes for producing a corona discharge localized about said first electrode and for creating an electric field such that the ions produced by said first electrode move toward said second electrode, in the direction of the liquid flow;

a display device coupled between said third and first electrodes for displaying said liquid mass flow;

means coupled to said second, third and fourth electrodes and connected to a control input of said voltage source for stabilizing the current supplied to said first electrode; and electrical means coupled to said third electrode for adjusting said measuring device for a nil liquid flow.

2. A measuring device according to claim 1 wherein said electrical means comprises means for transmitting to said display device only the current corresponding to the direct flow sensed by said third electrode.

3. A measuring device according to claim 1 wherein said electrical means comprises means for shifting the level of the signal sent to said display device.

4. A measuring device for measuring the flow rate of a liquid, comprising:

first, second, third and fourth electrodes positioned in the path of said liquid flow, said first, second, third and fourth electrodes being electrically isolated from each other, said second electrode being spaced from said first electrode in the flow direction, said third electrode being spaced from said second electrode in the flow direction, said fourth electrode being spaced from said first electrode in the counter-flow direction and being electrically connected to said second electrode;

a first voltage source coupled between said first electrode and said second, third and fourth electrodes for producing a corona discharge localized about said first electrode and for creating an electric field such that the ions produced by said first electrode move toward said second electrode, in the direction of the liquid flow;

a display device coupled between said third and first electrodes for displaying said liquid flow rate;

a second voltage source, said second voltage source having a constant voltage;

means connected to said second voltage source and to a control input of said first voltage source for stabilizing the current supplied to said first electrode; and electrical means coupled to said third electrode for adjusting said measuring device for a nil liquid flow.

5. A measuring device according to claim 4, wherein said electrical means comprises means for transmitting to said display device only the current corresponding to the direct flow sensed by said third electrode.

6. A measuring device according to claim 4, wherein said electrical means comprises means for shifting the level of the signal sent to said display device.

7. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counterflow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow;

means coupled to said second, third, fourth and fifth electrodes and connected to a control input of said voltage source for stabilizing the current supplied to said first electrode; and electrical means connected to said third and fifth electrodes for adjusting said measuring device for a nil liquid flow.

8. A measuring device according to claim 7, wherein said electrical means comprises means for transmitting to said display device only the current corresponding to the direct flow sensed by said third and fifth electrodes.

9. A measuring device according to claim 8, wherein said electrical means comprises a diode.

10. A measuring device according to claim 7, wherein said electrical means comprises means for shifting the level of the signal sent to said display device.

11. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode, the minimum distance between said first and second electrodes and said first and fourth electrodes being determined by the breakdown voltage between said first and second electrodes and said first and fourth electrodes;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow; and means coupled to said second, third, fourth and fifth electrodes and connected to a control input of said voltage source for stabilizing the current supplied to said first electrode.

12. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode, the minimum distance between said second and third electrodes and between said fourth and fifth electrodes being the distance for which the lines of force emanating from said first electrode traverse said second and fourth electrodes respectively, when said liquid is at rest, without quite reaching said third and fifth electrodes respectively;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow; and means coupled to said second, third, fourth and fifth electrodes and connected to a control input of said voltage source for stabilizing the current supplied to said first electrode.

13. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode, said electrodes being arranged within a measuring pipe and substantially perpendicular to the pipe axis, each electrode being a conductive grating occupying substantially the entire cross-sectional area of the pipe;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow; and means coupled to said second, third, fourth and fifth electrodes and connected to a control input of said voltage source for stabilizing the current supplied to said first electrode.

14. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow; and means coupled to said second, third, fourth and fifth electrodes and connected to a control input of said voltage source for stabilizing the current supplied to said first electrode, including means for stabilizing the ratio of the current supplied to said first electrode to the voltage of said voltage source.

15. A bi-directional measuring device for measuring the mass flow of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode;

a voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid mass flow, said display device being coupled to said fifth electrode through a phase inverter; and means coupled to said second, third, fourth and fifth electrodes and connected to a control input of said voltage source for stabilizing the current supplied to said first electrode.

16. A bi-directional measuring device for measuring the flow rate of a liquid, comprising:

first, second, third, fourth and fifth electrodes positioned in the path of said liquid flow, said first, second, third, fourth and fifth electrodes being electrically isolated from each other, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode;

a first voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said liquid flow rate;

a second voltage source, said second voltage source having a constant voltage; and means connected to said second voltage source and to a control input of said first voltage source for stabilizing the current supplied to said first electrode.

17. A measuring device according to claim 16, wherein said third and fifth electrodes are coupled to electrical means for adjusting said measuring device for a nil liquid flow.

18. A measuring device according to claim 17, wherein said electrical means comprises means for transmitting to said display device only the current corresponding to the direct flow sensed by said third and fifth electrodes.

19. A measuring device according to claim 18, wherein said electrical means comprises a diode.

20. A measuring device according to claim 17, wherein said electrical means comprises means for shifting the level of the signal sent to said display device.

21. A measuring device according to claim 16, wherein the lower limit of the distance between said first and second electrodes and said first and fourth electrodes is determined by the breakdown voltage between said first and second electrodes and said first and fourth electrodes.

22. A measuring device according to claim 16, wherein the lower limit of the distance between said second and third electrodes and between said fourth and fifth electrodes is the distance for which the lines of force emanating from said first electrode traverse said second and fourth electrodes respectively, when the liquid is at rest, without quite reaching said third and fifth electrodes respectively.

23. A measuring device according to claim 16, wherein all the electrodes are arranged within a measuring pipe and are substantially perpendicular to the pipe axis, each electrode being a conductive grating occupying substantially the entire cross-sectional area of the pipe.

24. A measuring device according to claim 16, wherein said means connected to said control input of said first voltage source includes means for stabilizing the ratio of the current supplied to said first electrode to the voltage of said first voltage source.

25. A measuring device according to claim 16, wherein said fifth electrode is coupled to said display device through a phase inverter.

26. A bi-directional measuring device for measuring the mass flow or the flow rate of a liquid, comprising:
first, second, third, fourth and fifth electrodes arranged within a measuring pipe substantially perpendicularly to the axis of the pipe, each electrode being a conductive grating occupying substantially the entire cross-sectional area of the measuring pipe, said five electrodes being electrically isolated from each other in said pipe, said second electrode being spaced from said first electrode in the flow direction, said third electrode being spaced from said second electrode in the flow direction, said fourth electrode being spaced from said first electrode in the counter-flow direction, said fifth electrode being spaced from said fourth electrode in the counter-flow direction, said second and fourth electrodes being arranged symmetrically with respect to said first electrode, said third and fifth electrodes being arranged symmetrically with respect to said first electrode, said second electrode being electrically connected to said fourth electrode;

a first voltage source coupled between said first electrode and said second, third, fourth and fifth electrodes for producing a corona discharge localized about said first electrode and for creating an electric field such that the ions produced by said first electrode move toward said second electrode in the flow direction and toward said fourth electrode in the counter-flow direction;

a display device coupled between said third and fifth electrodes for displaying said mass flow or said flow rate;

a phase inverter coupled between said fifth electrode and said display device;

a second voltage source, said second voltage source having constant voltage;

inverter means, the output of said inverter means being connected to a control input of said first voltage source, a first input of said inverter means adapted for connection to means coupled to said second, third, fourth and fifth electrodes for stabilizing the current supplied to said first electrode, said display device displaying thereby said mass flow, a second input of said inverter means adapted for connection to said second voltage source for stabilizing the current supplied to said first electrode, said display device displaying thereby said flow rate; and electrical means coupled to said third and fifth electrodes for adjusting said measuring device for a nil flow, said electrical means comprising diode means for transmitting to said display device only the current corresponding to the direct flow sensed by said third and fifth electrodes respectively, said electrical means also comprising means for shifting the level of the signals sent to said display device.

* * * * *